3,448,709
MARINE FLOAT CONSTRUCTION
Thomas C. Hardwick, Jr., San Leandro, Calif. 94577
Continuation-in-part of application Ser. No. 544,874,
Apr. 25, 1966. This application June 12, 1967, Ser.
No. 657,449
Int. Cl. B63b 35/02
U.S. Cl. 114—.5
10 Claims

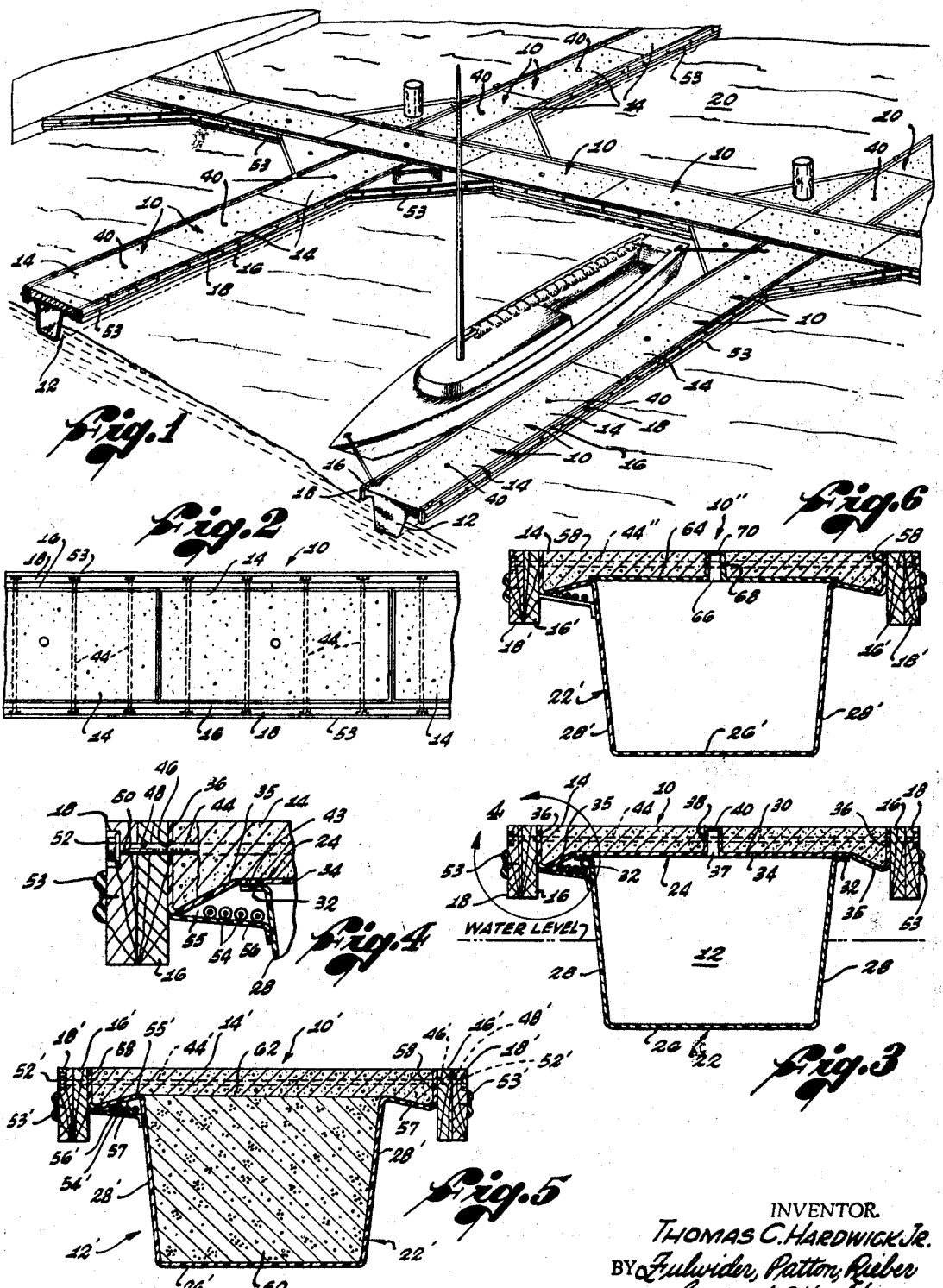

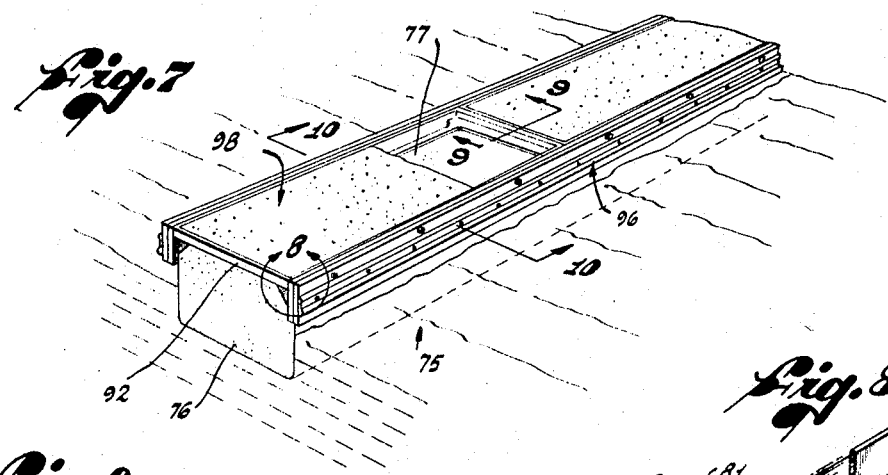
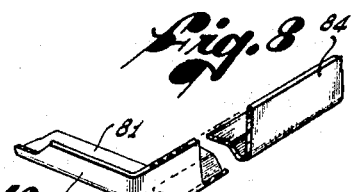
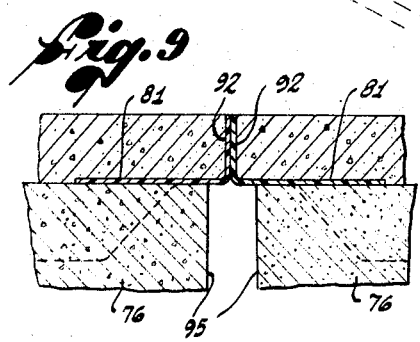
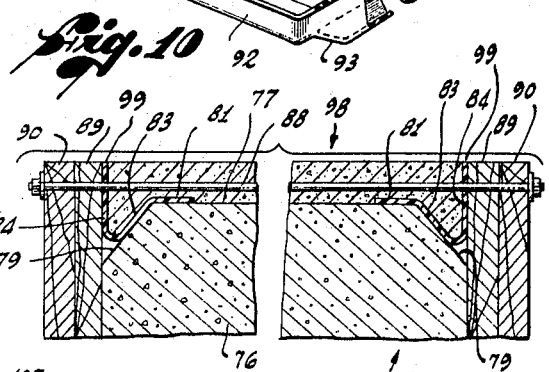
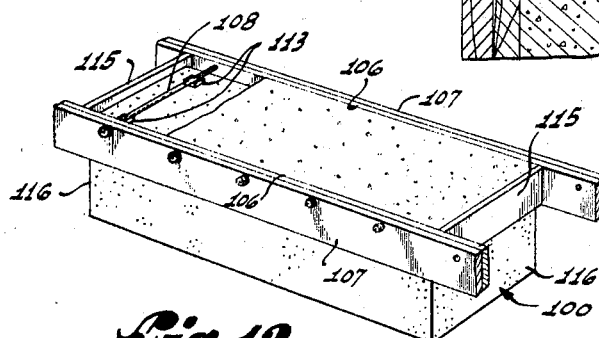
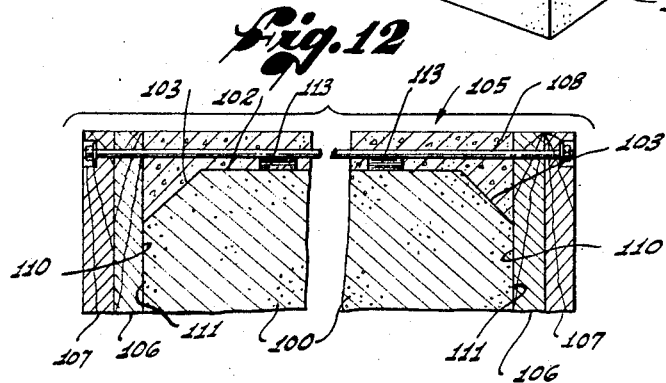
INVENTOR.
THOMAS C. HARDWICK
BY Fulwider, Patton, Rieber
Lee, and Utecht
ATTORNEYS United States Patent Office 3,448,709
Patented June 10, 1969

ABSTRACT OF THE DISCLOSURE

A marine float comprising a flotation unit with deck-defining means. Light weight concrete poured into the deck-defining means affords the float with a sturdy, durable and non-slip deck. A plurality of light floats may be joined together to form a marina dock section. In the method of constructing such float, the flotation units are assembled at the site of installation and readied for receiving concrete. Then, with such assembled unit positioned adjacent or in the water, the concrete is poured. In those instances where a dock section is being formed, the individual floats are joined together.

Cross-reference to related application

This application is a continuation-in-part of co-pending application Ser. No. 544,874, filed on Apr. 25, 1966, now abandoned, and entitled Marine Float Construction.

Background of the invention

The present invention relates to improvements in marine floats and, more particularly, to a novel float construction ideally suited to use in small craft marinas.

In the past, marine floats and especially those utilized to form docks and small craft marinas have taken a number of different forms. One of the earliest, and possibly still the most common, of these forms comprises a series of hollow flotation units, such as metal barrels, supporting a deck formed of a side-by-side array of wooden planks. Although such marine floats are relatively inexpensive to construct, they provide rather unstable footing and are very expensive to maintain.

In particular, the wooden planks forming the deck of such float constructions are subject to attack by moisture, and become losened from their support to the flotation units. Furthermore, nails in the planks rust rapidly and tend to pop out as the planks warp and bend with changes in the surrounding environment. Therefore, the wooden planks and nails require periodic and expensive servicing, such as scraping, sanding, painting and replacement. Also, the warped and loosened planks provide a rather unstable footing for persons walking along the deck.

A more recently developed form of marine float is the monolithic, lightweight concrete float. Such floats have a hollow central core and a flat top surface which may be utilized directly as the deck for the float. Short stub bolts are secured in the concrete sides of the float and provide means for attaching stringer members to a series of such floats whereby the series may be connected together to form a dock or portion of a small craft marina.

Although lightweight concrete is relatively inexpensive, and a concrete deck provides a firm, stable walking surface, monolithic, concrete floats are heavy, difficult to constructure, and require an appreciable curing time. Because of the weight and size of the floats, they are very expensive to ship. Also, great care must be exercised during shipping and during the positioning of the floats in the water to insure against cracking or other damage to the floats. Once the floats are in the water, if there are any cracks or small holes in the concrete, water of course will seep through and fill the hollow center causing the floats to sink. Furthermore, the small metal bolts often do not hold and in practice the stringer members frequently become loose from the floats and special means must be improvised to reattach them thereto.

Summary of the invention

To solve the problems described above, applicant provides a marine float having a sturdy, durable and non-slip deck structure, such as one formed of a concrete material, yet which may be quickly and easily constructed at the job site. The float embodies a flotation unit including deck-defining means which serves as a form or mold for receiving the lightweight concrete to provide the deck structure. Once the concrete is poured and has set, a deck structure with the desired properties is provided, and, advantageously, this is accomplished without encountering the problems inherent in the floats of the prior art.

The flotation unit of the invention is constructed and arranged to facilitate its storage, shipping and handling. It is either formed as an integral unit or in separate parts which are assembled at the job site. In carrying out the method of the invention, once the flotation unit is assembled and ready for receiving the concrete, the concrete is poured. Depending upon the particular conditions at the job site, pouring may take place with the flotation unit either adjacent or in the water.

Where it is desired to form a marina dock section, a plurality of appropriately shaped and similarly constructed floates are joined together. Again, depending upon the conditions at the job site, the floats may be joined either before or after the concrete is poured and with the assembled flotation units adjacent or in the water. As will be appreciated, the so-formed dock sections are, in turn, readily adapted to be floated into and secured in the desired marina-forming configuration.

Description of the drawing

FIGURE 1 is a perspective view of a section of a small craft marina incorporating the marine floats constructed in accordance with the present invention;

FIGURE 2 is a top view of a portion of the small craft marina of FIGURE 1, illustrating the manner in which the individual marine floats are connected together to form a small craft marina;

FIGURE 3 is a cross-sectional view of one form of the marine float of the invention;

FIGURE 4 is an enlarged fragmentary sectional view of a portion of the float construction of FIGURE 3;

FIGURE 5 is a cross-sectional view of an alternate form of the marine float construction;

FIGURE 6 is a cross-sectional view of another form of the marine float construction;

FIGURE 7 is a perspective view of a small craft marina incorporating still another form of marine float construction with a portion of the deck broken away and removed;

FIGURE 8 is a fragmentary perspective view of a portion of the form of marine float construction illustrated in FIGURE 7 with a section partially broken away;

FIGURE 9 is an enlarged fragmentary sectional view of a portion of the float construction of FIGURE 7;

FIGURE 10 is a broken cross-sectional view of the marine float construction shown in FIGURE 7;

FIGURE 11 is a perspective view of a portion of a small craft marina incorporating still another alternate form of the marine float construction; and FIGURE 12 is a broken cross-sectional view of yet another form of the marine float construction shown in FIGURE 11.

Description of the preferred embodiments

In the drawing, the marine float of the present invention is represented generally by the numeral 10 and includes a flotation unit 12 supporting a deck structure 14. Individual floats 10 may be connected together in series by stringers 16 and facer members 18 to form any desired shaped marina dock section, or, as illustrated in FIGURE 1, a small craft marina 20.

More particularly, in one form of the marine float 10 illustrated in FIGURE 3, the flotation unit 12 comprises a hollow tub 22 and a cover member 24. The tub 22 includes a flat bottom 26, four side walls 28, and an open top 30. Preferably, the side walls 28 slope inwardly towards the bottom 26 and include generally flat, horizontally-extending marginal edges 32 for supporting the cover member 24.

The cover member 24 is a generally rectangular, shallow, open box-like structure including a flat central bottom portion 34 supported on the horizontal edges 32 of the tub 22, a downwardly inclined, generally rectangular outer bottom portion 35 extending outwardly from the central portion below the edges 32, and four side walls 36 extending vertically from the edges to the outer bottom portion 35 to form a deck rim. The central bottom portion 35 includes an opening 37 surrounded by a vertical tubular member 38. The top of the tubular member 38 is substantially level with the top edges 42 of the side walls 36 and forms a passage from the interior chamber of the tub 22 which is normally sealed by a plug 40.

The tub 22 and the cover member 24 of the form of the float 10 shown in FIGURE 3 are preferably formed of a lightweight metal, such as anodized aluminum, or a plastic, such as a glass fiber reinforced plastic. Such materials are rust resistant, subject to minimal attack by bacteria and marine life, and require little servicing over long periods in the water. Whether the tub and cover member are metal or plastic, however, the cover member seals the open top 30 of the tub 22 to trap air within the tub to thereby define a highly buoyant flotation unit. In this regard, the central bottom portion 34 of the cover member 24 is sealed to the top of the horizontal edges 32 of the tub 22. If the tub and cover member are formed of a lightweight metal, the sealing may be accomplished by welding. If the tub and cover member are plastic, a waterproof sealant, such as that represented at 43 of FIGURE 4, may be employed to secure the cover member to the tub.

In addition to sealing the top of the tub 22, the cover member 24 also acts as a deck-defining form for the deck structure 14 of the marine float 10. In this regard, the deck structure 14 is a flat, monolithic body preferably a concrete slab formed by pouring a light weight concrete material into the cover member 24 atop the tub 22 and by leveling the top of the concrete flush with the top edges 42 of side walls 36 and the top of the tubular member 38. When the concrete dries, it produces an extremely sturdy deck structure which also imparts rigidity to the entire marine float 10. In addition, such a deck construction provides a firm, non-slip footing for those walking on the marine float 10, is substantially impervious to water, and requires little if any maintenance over extremely long periods of use.

Accordingly, it is appreciated that the present invention provides a simple marine float construction 10 which combines a light weight, yet sturdy, long-lasting and water and marine life resistant flotation unit 12 with an extremely sturdy and substantially indestructible deck structure 14.

Moreover, since the flotation unit 12 is formed of either a light weight metal or a plastic material, it is very light weight and is simple and inexpensive to handle, ship and assemble. In particular, both the tub 22 and cover member 24 are designed for stacking in large quantities and in a minimum of space. Thus stacked, the tubs and cover members may be easily handled and shipped at relatively low costs from one location to another. Then, at the site of an installation, the cover members may be mounted on top of the tubs and sealed thereto by appropriate means. Next, the flotation unit, formed by the cover member and tub, may be stationed adjacent or in the water at the desired location and a light weight concrete material poured into the cover member 24 and leveled flush with the top edges 42 of the side walls 36 to form the deck structure 14. The assembly and deck formation operations are very simple to perform and do not require skilled personnel. In fact, the marine float 10 is literally designed for "do-it-yourself" assembly.

The marine float 10 may be of various sizes and shapes without departing from the spirit of the invention. In fact, a single large float may act as a rest point for swimmers in a large body of water, such as a lake or an ocean, and may provide a platform for diving boards and the like. Alternatively, the marine float 10 may be connected to like marine floats to form a larger dock section or a small craft marina, such as illustrated in FIGURE 1.

In the present invention, when it is desired to form a large float or a small craft marina by connecting together a series of marine floats 10, or when it is desired to reinforce the outsides of the basic form of the marine float, the float construction includes the stringers 16 and facer members 18. The stringers 16 and facer members 18 may be combined as one member, but are preferably separate wooden planks. When a single float 10 is to be reinforced, a stringer 16 extends along each side wall 36 of the cover member 24 and is tightly connected thereto. The facer members 18 overlie the stringers 16 and are also connected to the side walls 36 to act as smooth bumpers for the marine float. When a series of marine floats 10 are to be connected together to form a large float or a marina, however, the stringers 16 and facer members 18 are long planks and extend along opposite sides of the series of floats.

In each instance, the stringers and facer members are connected to the marine floats by a plurality of laterally spaced metal tie bars 44. The tie bars 44 extend horizontally across the cover member 24 through openings 46 in the side walls 36. Beyond the side walls 36, opposite ends of the tie bars 44 pass through aligned openings 48 and 50 in the stringers 16 and facer members 18 and threadedly receive nuts 52 which hold the stringers and facer members on the tie bars and tightly against the flat, vertical side walls of the cover member. Preferably, the outer end of the openings 50 are enlarged to receive the nuts 52 which are thus countersunk into the facer members 18. Also, strips 53 of resilient material, such as rubber, are connected to the sides and extend the length of the facer members to prevent boats from scraping against the marine float.

It is of course appreciated that the metal tie bars 44 are inserted through the cover member 24 prior to the pouring of the concrete forming the deck structure 14 and act as reinforcing members for the desk structure. If desired, additional concrete reinforcing may be provided by including a wire mesh (not shown) in and across the cover member 24. In addition, depending on the conditions at the construction site, the series of floats 10 may be connected together with the stringers 16 and facer members 18, either before or after the pouring of the concrete.

The reinforced deck structure 14 of each float 10 combines in the series of floats to provide a firm, flat and stable path for those walking along the float or marina 20. The stable character of the marina 20 formed by the series of floats also permits water pipes and electrical cables 54 to be safely supported by the series of floats and to be run to any deired point or points along the marina. In particular, in the illustrated float structure, the pipes and cables run along a recess 55 between the inclined bottom portion 35 of the cover member 24 and the adjacent side wall of the tub 22, and are supported by straps 56 connected to the cover member and tub in the manner most clearly represented in FIGURE 4.

Being formed of concrete, the deck structure for the marina 20 requires little, if any, maintenance. However, should the deck structure 14 or flotation unit 12 of any one of the marine floats 10 become damaged or require other extensive servicing, it is a simple matter to remove the damaged float from the series and replace it with a substitute.

This may be accomplished by sawing through the damaged float's tie rods 44 between the stringers 16 and side walls 36. Then by removing the plug 40, water may be introduced into the interior chamber of the hollow tub 22 through the passage formed by the tubular member 38. As water is introduced into the tub 22, the flotation unit 12 and deck 14 begin to sink. When the top of the deck structure 14 is below the bottom of the stringers 16, the damaged float may be pushed under the stringers and towed to shore. There, the water may be pumped from the tub 22 and the damaged float repaired.

It is a simple matter to drop the flotation unit of the replacement float into the opening in the series of floats. New tie rods 44 then may be inserted through the holes in the facer members 18 and stringers 16 to extend across the new cover member 24 to hold the flotation unit in place. Finally, the concrete deck may be poured in the manner previously described to complete the replacement float construction.

A second form of float possessing many of the advantages and features of the marine float 10 is illustrated in FIGURE 5. Due to the similarity between the structures of FIGURES 3 and 5, the same reference numerals with a prime (') notation are employed in FIGURE 5 to designate elements which are similar to those shown and previously described in connection with FIGURE 3. A detailed discussion of such elements will not be here repeated and the present description will be directed primarily to the differences between this and the prior form of the invention.

As represented, the marine float 10' includes the flotation unit 12' and the deck structure 14'. The deck structure 14' is the same as that previously described in connection with FIGURE 3, comprising a concrete slab reinforced by tie bars 44'. Opposite ends of the tie bars 44' extend through openings 48' and 50' in stringers 16' and facer members 18' to receive nuts 52' which hold the stringer and facer members on the tie bars and securely against opposite sides of the flotation unit 12'.

The flotation unit 12' differs somewhat from that illustrated in FIGURE 3 and comprises a hollow tub 22' having a closed bottom 26', four closed side walls 28', and an open top 30'. The upper portions of the side walls 28' include outwardly and downwardly inclined portions 57 leading and connected to vertical upper side wall portions 58. The tie bars 44' extend through the upper side wall portions 58 and the stringers 16' bear thereagainst.

In addition to the tub 22', the flotation unit 12' includes a quantity 60 of a plastic material, such as polystyrene, which fills the bottom portion of the tub to the top of the inclined portions 57 of the side walls 28'. The top surface 62 of the plastic material 60 acts as the base, while the upper side wall portions 58 act as the sides of a deck-defining form for the concrete deck structure 14', which may be poured into the top of the tub in the manner previously described. Accordingly, the structure of FIGURE 5 eliminates the need for a separate cover member as well as separate sealing of the cover member to a tub to form a flotation unit.

Another foam of float construction possessing the advantages and features of the marine float 10 is illustrated in FIGURE 6 and represented by the numeral 10". The float 10" comprises a combination of the hollow tub 22' of FIGURE 5, a cover plate 64, and the deck structure 14 of the FIGURE 3. Tie bars 44" reinforce the deck structure and extend through upper side wall portions 58 of the tub 22' to connect stringers 16' and facer members 18' to the sides of the flotation unit, thereby completing the marine float construction.

The cover plate 64 resembles the flat, central portion of the cover member 24 and is supported upon and sealed to the tops of the side walls 28' of the tub 22'. In addition, the cover plate 64 includes an opening 66 surrounded by a vertical tubular member 68. The top of the tubular member 68 is substantially level with the top edges of the side walls 58, again to form a passage from the interior of the tub to the outside, and is normally sealed by a plug 70.

The top surface of the cover plate 64 acts as the base, while the upper side wall portions 58 act as the sides of a deck-defining form for the concrete deck structure 14, which may be poured into the top of the tub in the manner previously described.

Another alternate form of float construction possessing the advantages and features of the marine float 10 is illustrated in FIGURES 7 through 10, and is generally represented by the numeral 75. In this form, the float 75 has flotation means 76 made of a generally rectangular block of buoyant foam material, such as polystyrene or polyurethane, in place of the Fiberglass or metal tubs of the previous floation units 12, 12' and 22'. Portions of the top 77 of the flotation unit 76 are cut away to form longitudinal beveled edges 79.

A deck-defining ring 80 rests on top of the flotation means 76 with a flat inner portion 81 in contact with the top 77 and a downwardly inclined trough portion 83 contacting the beveled edges 79, and such means and ring together comprise the flotation unit of this embodiment. The downwardly inclined trough portion 83 recurves upwardly to form vertical side walls 84 which are coplanar with the vertical walls 86 of the floation unit 76.

The bars 88, stringers 89 and facer members 90 are mounted on the flotation means 76 and deck-defining ring 80 in the same manner as in the previous three forms of the marine float, but because the side walls 84 are coplanar with the vertical walls 86 of the flotation unit 76, the stringers 89 will be in contact with both the side walls and the walls.

While the longitudinal edges of the deck-defining ring 80 form a trough portion, the end walls 92 of the deck-defining ring 80 are not downwardly inclined, but extend directly vertically upward from the flat inner portion 81 of the ring, as shown in FIGURE 9. There is, then, a transition portion 83 near the transverse ends 116 of the deck-defining ring 80 which gradually elevates the bottom of the trough portion 83 to the level of the flat inner portion 81, in order to provide a one-piece construction of the deck-defining ring 80, as shown in FIGURE 8.

The end walls 92 of the deck-defining ring 80 extend a short distance beyond the edges of the transverse end walls 95 of the flotation means 76 so that when the floats 75 constructed according to the fourth form are aligned end-to-end to form a marina dock section 96, as shown in FIGURE 9, the transverse end walls 95 of the flotation means 76 of abutting floats 75 do not contact each other, thereby eliminating abrasion which could cause deterioration of the flotation means.

The side walls 84 and end walls 92 of the deck-defining ring 80 in conjunction with the top 77 of the flotation means 76 act as the sides and bottom of a deck-defining form for the concrete deck structure 98 constructed by pouring a light weight concrete material into the form and leveling it with the top edges 99 of the ring.

Still another form of float construction possessing advantages of the marine float 10 is illustrated in FIGURES 11 and 12. This form also employs a generally rectangular block of foam material, such as polystyrene or polyurethane, as a flotation means 100. The top 102 of the flotation means 100 also has longitudinal beveled edges 103. In this form, the deck-defining form for the concrete deck structure 105 comprises the stringers 106, adjacent facer members 107 and associated tie bars 108 which are mounted on the flotation means 100 with the inside faces 110 of the stringers 106 engaging the longitudinal walls 111 of the flotation means.

The tie bars 108 are initially supported above the top 102 of the flotation means 100 by spacers 113. The deck-defining form is limited by the top 102 of the flotation means 100, the beveled edges 103, and the inside faces 110 of the stringers 106. The transverse ends of the deck-defining form are limited by end planks 115 disposed on the transverse ends 116 of the flotation means 100 between the inside faces 110 of the stringers 106.

The deck structure 105 is again constructed by pouring light weight concrete into the deck-defining form and leveling it with the top edges 118 of the stringers 106 and facer members 107.

This form of the flotation construction 10 is particularly adapted to the method of constructing marinas in that the stringers 106 and facer members 107, which are necessary to hold individual flotation means 100 together in the marina, also serve as a part of the deck-defining form into which the light weight concrete is poured.

From the foregoing description, it is appreciated that the present invention provides an improved marine float which is simple in design and easy to manufacture and assemble into an extremely sturdy and long-lasting unit. This, the present invention accomplishes by combining the desirable features of a concrete deck with the water resistant and durable features of a light weight metal, plastic, or foam material flotation unit. Moreover, the present invention combines these features in a manner whereby the top of the flotation unit acts as a form for concrete which may be poured directly into the flotation unit to produce the deck structure.

While particular embodiments of the marine float have been described in some detail herein, changes and modifications may be made in the illustrated forms without departing from the spirit and scope of the invention.

I claim:

1. A marine float construction comprising:
   a highly buoyant block of foamed material having a top and a bottom;
   a ring of glass fiber reinforced material carried on top of said block, said ring having side walls and end walls defining sides of a deck-defining form for said float; and
   a deck formed from a concrete material on top of said block, said deck being laterally contained by said side walls and end walls of said ring.

2. A marine float construction comprising:
   a highly buoyant block of foamed material having a top and a bottom;
   deck defining means including stringers extending along the upper longitudinal edges of said block with end planks across the ends of said block between said stringers, the inside faces of said stringers and end planks extending above the top of said block to define a deck-defining form for said float; and
   a deck formed on top of said block from a concrete material poured into said deck defining means, said deck being laterally contained by said inside faces of said stringers and end planks.

3. A marina dock section comprising:
   a plurality of buoyant blocks arranged in a row in end-to-end relation and having generally rectangular top surfaces adapted to support concrete poured thereon;
   a deck rim permanently affixed to each of said blocks and including upstanding side and end walls surrounding the top surfaces of each of the blocks, said side and end walls extending a preselected distance above said top surfaces, and cooperating with the latter to define a recess of preselected depth above each of said blocks;
   stringers extending along and abutting against the side walls of said deck rim on both sides of said row;
   a layer of concrete material poured in said deck rim on said top surfaces and level with the upper edges of said walls to form a deck permanently contained and edged by said rim;
   and means connecting said stringers to said side walls and to said concrete material thereby joining said blocks together.

4. A marina dock section as defined in claim 3 in which said deck rim comprises a plurality of generally rectangular, trough-like cover members having bottom walls overlying said blocks to form said top surfaces, and upstanding side and end walls formed integrally with said bottom walls, said cover member being sealingly secured to said block.

5. A marina dock section as defined in 4 in which each block is a hollow tub having an open upper side closed and sealed by one of said cover members.

6. A marina dock section as defined in claim 3 in which each of said blocks comprises a hollow tub having an open upper end, and a cover plate overlying said open end and sealed to said tub, said dock rim comprising integral extensions of the walls of said tub projecting laterally outwardly from the tub and terminating in said upstanding rim walls.

7. A marina dock section as defined in claim 3 in which each of said blocks is composed at least in part of buoyant foamed material, including a top surface of said foamed material, and said deck rim is separately formed by a rectangular ring including said side and end walls, said ring extending around and projecting above said block.

8. A marina dock section as defined in claim 3 in which said connecting means comprise tie bars extending through said stringers, said side walls and said concrete material.

9. The method of making a marina dock section with a deck of concrete material supported on a plurality of buoyant blocks, said method comprising the steps of:
   permanently fixing to the upper side of each said blocks a deck rim having sides and ends projecting above the block and defining an upwardly opening recess overlying the block;
   arranging the blocks end-to-end in a row having the configuration of the dock section;
   positioning stringers along both sides of said rims and securing the stringers to the rims and thus to the blocks to join the blocks together and hold them in said row;
   and pouring a layer of concrete material into said deck rims and leveling the material with the edges of said rim walls thereby to complete said section with said rim forming a permanent container for said deck.

10. The method defined in claim 9 in which said stringers are secured to said rims by inserting tie bars through the rims prior to pouring of said concrete material, to extend transversely across said blocks, passing said tie bars through the stringers on both sides of said rims, and fastening said tie bars in place.

References Cited

UNITED STATES PATENTS

| | | |
|---|---|---|
| 3,091,203 | 5/1963 | Usab. |
| 3,128,737 | 4/1964 | Usab. |
| 3,179,076 | 4/1965 | Sheffield. |
| 3,193,855 | 7/1965 | Chapman _____ 9—11 |

TRYGVE M. BLIX, *Primary Examiner.*